(12) United States Patent
Kiddie et al.

(10) Patent No.: US 8,045,976 B2
(45) Date of Patent: *Oct. 25, 2011

(54) MOBILITY CALL MANAGEMENT

(75) Inventors: David John Kiddie, Coquitlam (CA);
John Joseph Geyer, Vancouver (CA);
Mandy Chan, Vancouver (CA)

(73) Assignee: Aegis Mobility, Inc., Vancouver (CA)

( * ) Notice: Subject to any disclaimer, the term of this patent is extended or adjusted under 35 U.S.C. 154(b) by 569 days.

This patent is subject to a terminal disclaimer.

(21) Appl. No.: 11/696,568

(22) Filed: Apr. 4, 2007

(65) Prior Publication Data
US 2010/0029270 A1 Feb. 4, 2010

Related U.S. Application Data

(60) Provisional application No. 60/744,263, filed on Apr. 4, 2006.

(51) Int. Cl.
*H04W 40/00* (2009.01)
(52) U.S. Cl. .......... 455/428; 455/418; 455/456.1; 455/414.1; 455/419; 455/550.1
(58) Field of Classification Search .......... 455/418, 455/456.1, 414.1, 419, 550.1, 463, 410, 441
See application file for complete search history.

(56) References Cited

U.S. PATENT DOCUMENTS

| | | | |
|---|---|---|---|
| 5,852,775 A | 12/1998 | Hidary | |
| 5,862,476 A | 1/1999 | Hasegawa | |
| 5,890,067 A | 3/1999 | Chang et al. | |
| 5,963,550 A | 10/1999 | Hirata et al. | |
| 6,154,172 A | 11/2000 | Piccionelli et al. | |
| 6,208,866 B1 | 3/2001 | Rouhollahzadeh et al. | |
| 6,263,190 B1 | 7/2001 | Mamori et al. | |
| 6,311,078 B1 | 10/2001 | Hardouin | |
| 6,353,778 B1 | 3/2002 | Brown | |
| 6,389,287 B1 | 5/2002 | Smith et al. | |
| 6,496,709 B2 | 12/2002 | Murray | |
| 6,505,046 B1 | 1/2003 | Baker | |
| 6,526,275 B1 | 2/2003 | Calvert | |
| 6,546,257 B1 | 4/2003 | Stewart | |
| 6,580,973 B2 | 6/2003 | Leivian et al. | |
| 6,600,975 B2 | 7/2003 | Moriguchi et al. | |
| 6,647,257 B2 | 11/2003 | Owensby | |
| 6,647,269 B2 | 11/2003 | Hendrey et al. | |
| 6,650,894 B1 | 11/2003 | Berstis et al. | |
| 6,690,940 B1 | 2/2004 | Brown et al. | |
| 6,701,158 B2 | 3/2004 | Moreth | |

(Continued)

FOREIGN PATENT DOCUMENTS

EP 1931109 A1 6/2008

(Continued)

*Primary Examiner* — Kamran Afshar
*Assistant Examiner* — Shahriar Behnamian
(74) *Attorney, Agent, or Firm* — Knobbe Martens Olson & Bear LLP

(57) ABSTRACT

A mobility call management service is disclosed that provides enhanced call management functionality for a wireless mobile terminal (MT). Incoming and/or outgoing calls are managed based on an assessment of the degree of motion of the MT, or other available data pertinent to the MT's physical situation, such as but not limited to it's location, movement, or rate of movement. The degree of motion or other assessment may be used to determine whether a communication can safely terminate on, originate from, or continue safely on the MT, so as to reduce or remove driver distraction.

28 Claims, 15 Drawing Sheets

Flow diagram of one embodiment of an outgoing call from an MT

U.S. PATENT DOCUMENTS

| | | |
|---|---|---|
| 6,714,519 B2 | 3/2004 | Luzzatti et al. |
| 6,728,542 B2 | 4/2004 | Meda |
| 6,731,925 B2 | 5/2004 | Naboulsi |
| 6,771,946 B1 | 8/2004 | Oyaski |
| 6,807,435 B2 | 10/2004 | Yamashita |
| 6,816,731 B1 | 11/2004 | Maruyama |
| 6,819,928 B1 | 11/2004 | Hokao |
| 6,832,093 B1 | 12/2004 | Ranta |
| 6,922,571 B1 | 7/2005 | Kinoshita |
| 6,934,547 B2 | 8/2005 | Suzuki |
| 6,961,561 B2 | 11/2005 | Himmel et al. |
| 6,973,333 B1 | 12/2005 | O'Neil |
| 7,003,525 B1 | 2/2006 | Horvitz et al. |
| 7,006,793 B2 | 2/2006 | Himmel et al. |
| 7,015,831 B2 | 3/2006 | Karlsson et al. |
| 7,064,656 B2 | 6/2006 | Belcher et al. |
| 7,072,753 B2 | 7/2006 | Eberle et al. |
| 7,110,749 B2 | 9/2006 | Zellner et al. |
| 7,149,627 B2 | 12/2006 | Ockerse et al. |
| 7,181,228 B2 | 2/2007 | Boesch |
| 7,394,791 B2 | 7/2008 | Proctor, Jr. |
| 7,430,724 B2 | 9/2008 | Othmer |
| 2002/0168981 A1* | 11/2002 | Meda ............................ 455/441 |
| 2002/0198004 A1 | 12/2002 | Heie et al. |
| 2003/0129995 A1 | 7/2003 | Niwa et al. |
| 2003/0137408 A1 | 7/2003 | Breiner |
| 2003/0143988 A1 | 7/2003 | Jamadagni |
| 2004/0092253 A1 | 5/2004 | Simonds et al. |
| 2004/0198332 A1 | 10/2004 | Lundsgaard |
| 2004/0248589 A1 | 12/2004 | Gwon et al. |
| 2004/0253963 A1 | 12/2004 | Park et al. |
| 2005/0037760 A1 | 2/2005 | Maruyama |
| 2005/0096026 A1 | 5/2005 | Chitrapu et al. |
| 2005/0119002 A1 | 6/2005 | Bauchot et al. |
| 2005/0153680 A1 | 7/2005 | Yoshioka et al. |
| 2005/0255874 A1* | 11/2005 | Stewart-Baxter et al. . 455/550.1 |
| 2005/0264404 A1* | 12/2005 | Franczyk et al. ............. 340/441 |
| 2006/0040640 A1 | 2/2006 | Thompson et al. |
| 2006/0046765 A1 | 3/2006 | Kogure |
| 2006/0099940 A1* | 5/2006 | Pfleging et al. ................ 455/419 |
| 2006/0099959 A1 | 5/2006 | Staton et al. |
| 2006/0099969 A1 | 5/2006 | Staton et al. |
| 2006/0104297 A1* | 5/2006 | Buyukkoc et al. ............ 370/409 |
| 2006/0116807 A1 | 6/2006 | Hijikata |
| 2006/0148490 A1 | 7/2006 | Bates et al. |
| 2006/0211412 A1* | 9/2006 | Vance ............................ 455/418 |
| 2006/0217130 A1 | 9/2006 | Rowitch et al. |
| 2006/0293842 A1 | 12/2006 | Casino |
| 2007/0072553 A1 | 3/2007 | Barbera |
| 2007/0072616 A1* | 3/2007 | Irani ............................... 455/441 |
| 2007/0082678 A1 | 4/2007 | Himmelstein |
| 2008/0061988 A1 | 3/2008 | Mock et al. |

FOREIGN PATENT DOCUMENTS

| | | |
|---|---|---|
| WO | WO2006/070253 A2 | 7/2006 |
| WO | WO2008/109477 A1 | 9/2008 |

* cited by examiner

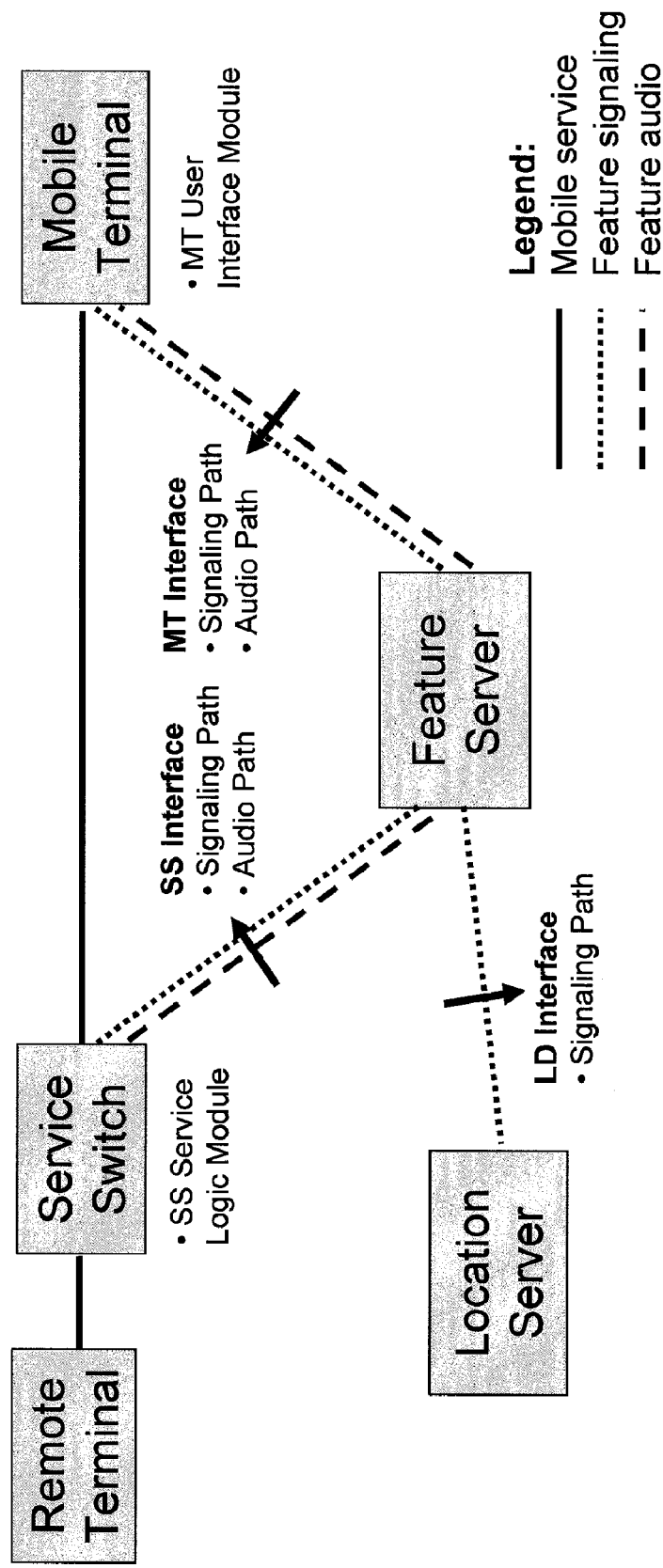
Fig. 1    One generic embodiment of the system architecture

Fig. 2 Flow diagram of one embodiment of an incoming call to an MT

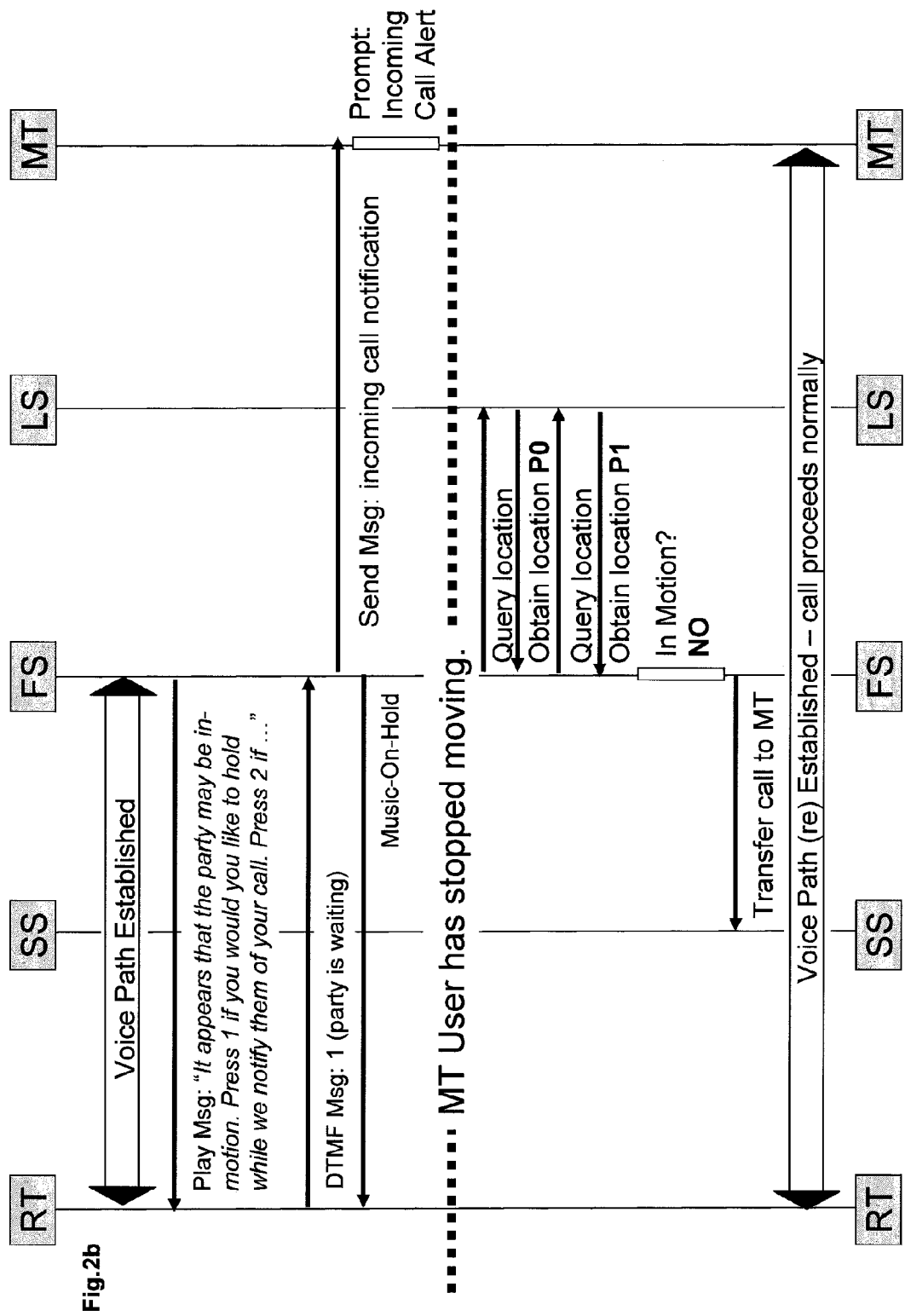

Fig. 3  Flow diagram of one embodiment of an outgoing call from an MT

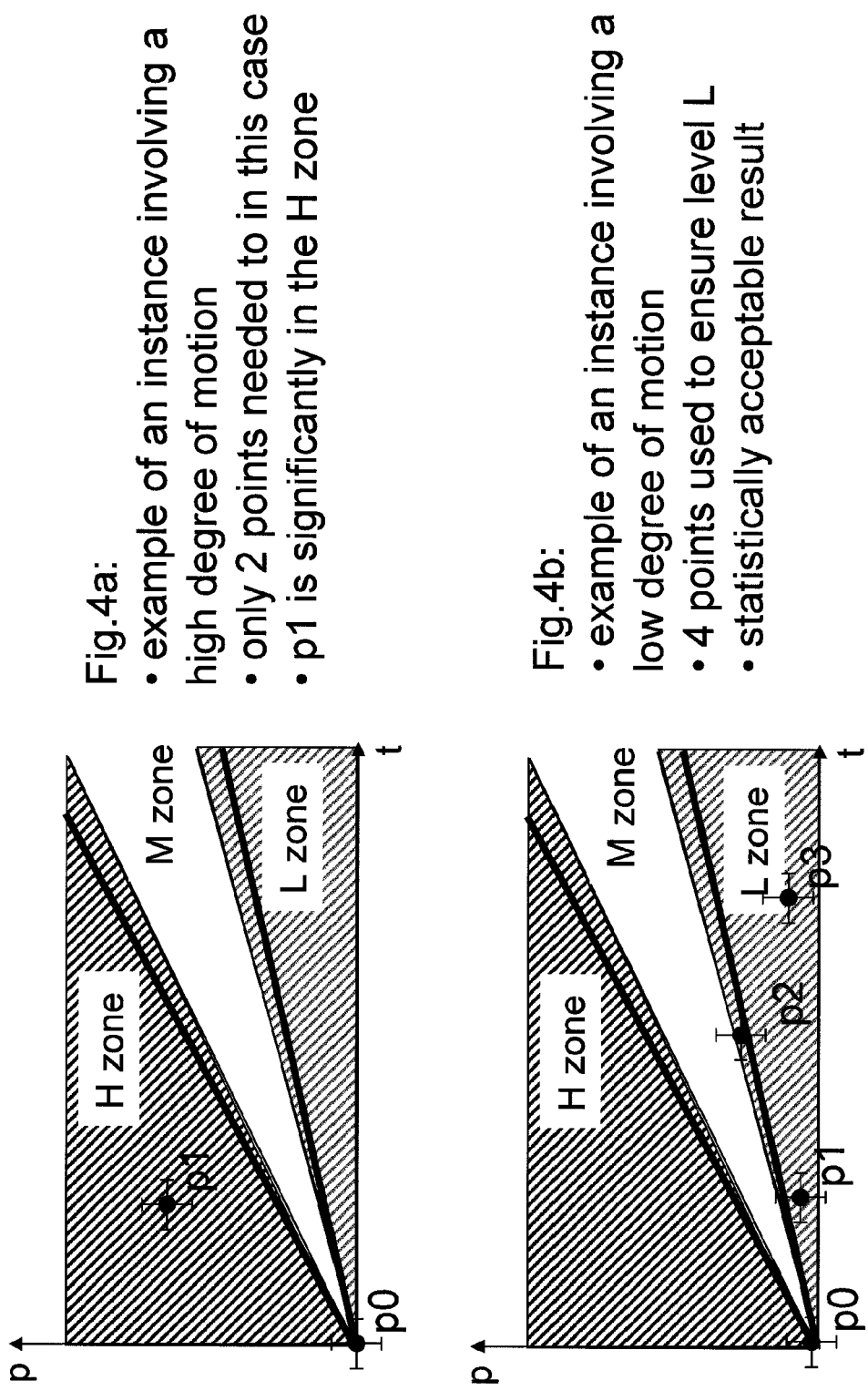
Fig. 4  Examples of input data for a "degree of motion" calculation

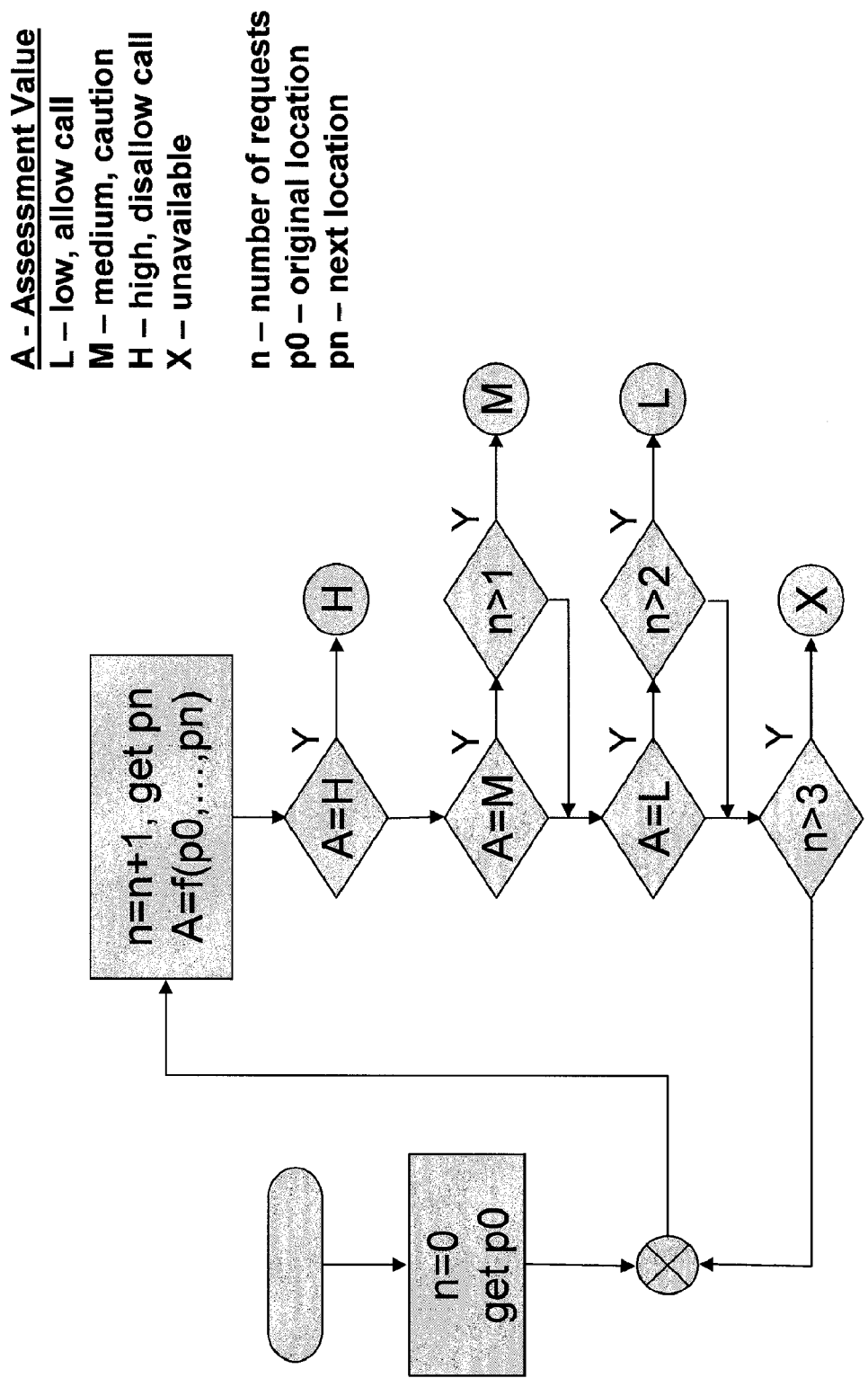
Fig. 5 Example algorithm of the "degree of motion" assessment

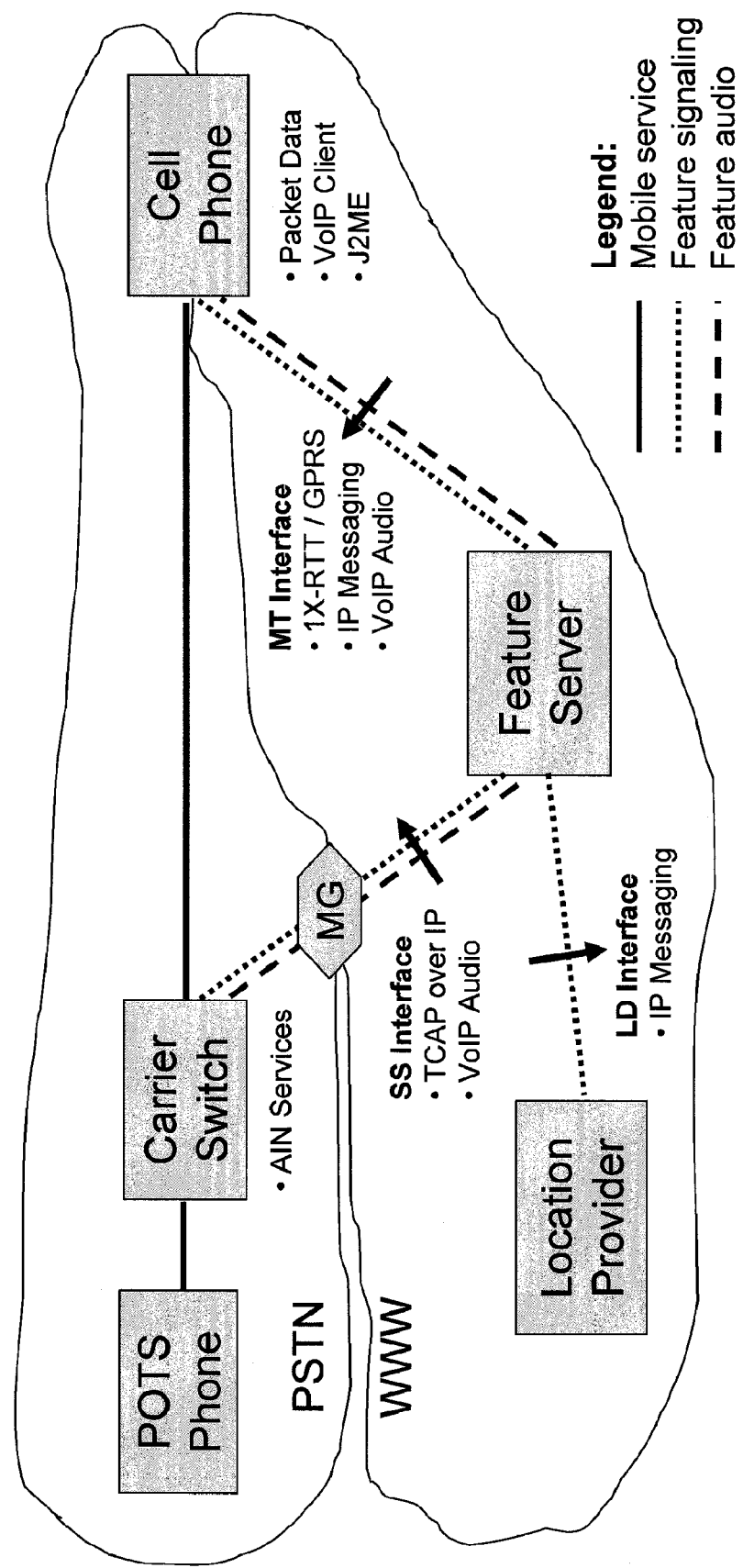
Fig. 6   Embodiment 1: a PSTN scenario

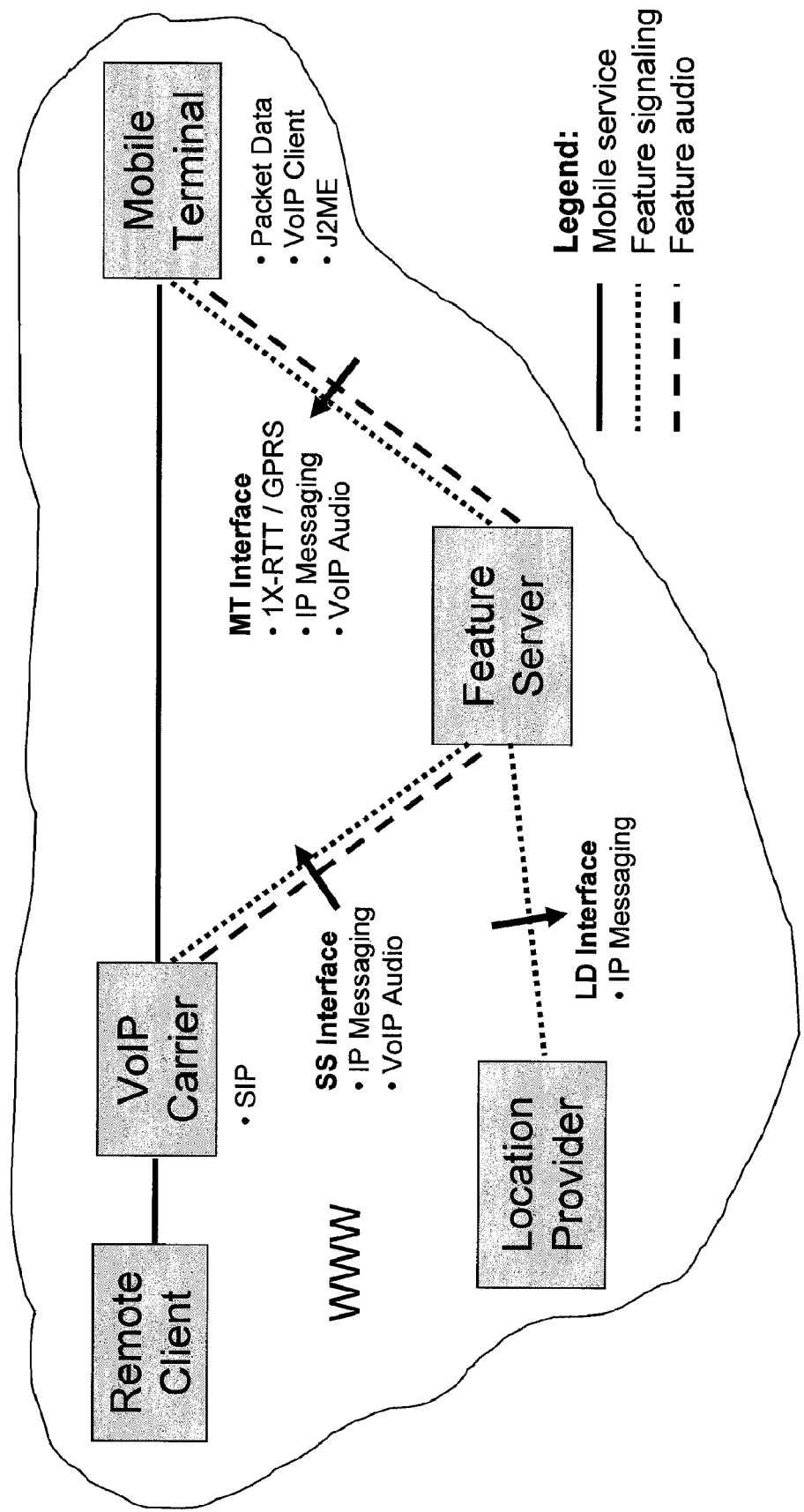
Fig. 7    Embodiment 2: a VoIP scenario

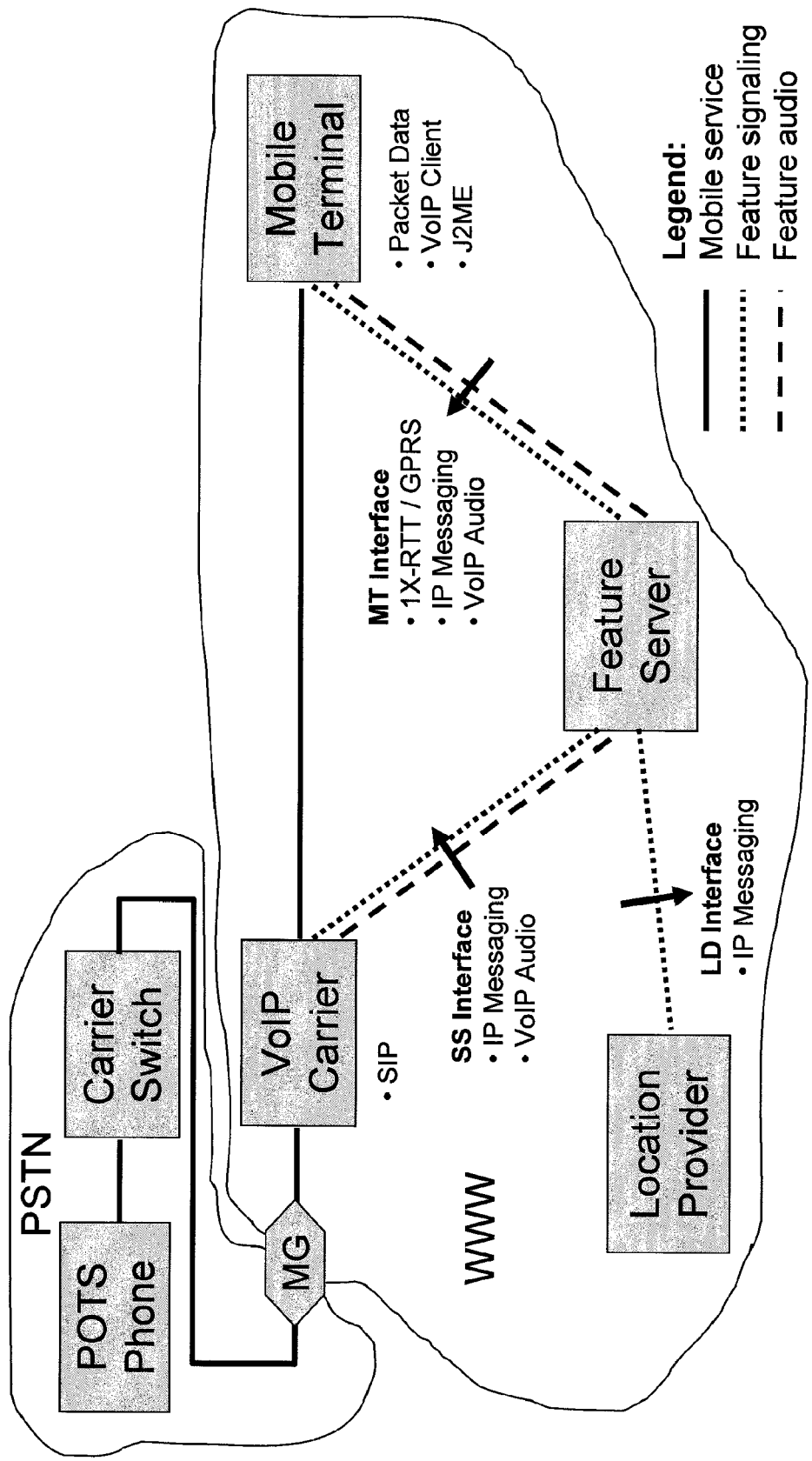
Fig. 8    Embodiment 3: a PSTN - VoIP hybrid scenario

MOBILITY CALL MANAGEMENT

PRIORITY CLAIM

This application claims the benefit of U.S. Provisional Appl. No. 60/744,263, filed Apr. 4, 2006, the disclosure of which is hereby incorporated by reference.

FIELD OF THE INVENTION

The present invention relates to wireless communications and call management, and more particularly, to the management of calls placed to or from a mobile terminal.

BACKGROUND OF THE INVENTION

Each year more than 42,000 people are killed and more than 3 million are injured in more than 6 million motor vehicle accidents on the nation's roads according to the National Highway Transportation Safety Association (NHTSA). In its most recent 2005 report, the NHTSA estimates that driver distraction is contributing to 20-30 percent of all motor vehicle crashes or 1.2 million accidents each year. A 2002 Harvard Center for Risk Analysis suggested that the rise in deaths and serious injuries and damages is attributable to the fast growing pool of cell phone users with 85 percent of users admitting to cell phone use while driving. Another study found that the risk of vehicle accidents is four times greater when motorists are using cell phones and produce the equivalent effect of reduced physical control and mental inattentiveness as individuals having reached 0.08 percent blood alcohol level, the legal limit in most states for driving under the influence. Virginia Tech Transportation Institute's 2005 study reported that hand-held wireless devices were among the highest distraction-related factors in crashes and were the leading distraction-related factor in near crashes.

Early researchers believed that hands-free phones were safer to use than hand-held phones. Recent studies have shown that this is assumption is untrue and that earlier assumptions may have offered motorists a false sense of safety. The mechanism by which cell phone conversations interfere with driving performance is not based on whether the motorist is using a hands-free or a hand-held device but rather by attentional interference, the diversion of attention from the driving task to the cell phone conversation itself In neurophysiology, this competition between visual and auditory stimuli is known as dual-task competition. Dual-task competition occurs when auditory tasks unrelated to the visual task are introduced. As a result, the degree of attentional distraction depends on the complexity of the driving task and how engaged the driver is to the cell phone conversation.

Recognizing the severity of this problem to public safety, 17 of the 50 states in America have introduced legislation that restricts or bans cell phone use while driving. The NHTSA is lobbying to have all 50 states adopt restrictions on cell phone use while driving. Similar restrictions and bans have been adopted by both developed and underdeveloped countries around the world, including UK, France, Germany, Finland, Japan, Singapore, Hong Kong, India and many others. Fines are commonly the method of encouraging those who violate the cell phone use restrictions. In New Delhi, India, motorists who are found talking on their cell phone while driving have been imprisoned.

With the emergence of more and more wireless services and applications, the likelihood of using the cell phone and other wireless communication devices in a moving vehicle will continue to rise. It is necessary to put in place guidelines in which users are able to take advantage of their increasingly sophisticated services but at the same time ensure that public safety is not compromised. The reliance on public education may not be adequate because of the convenience of cell phone communications. Furthermore, infringement on restrictions and bans is difficult to monitor, making it difficult for such legislation to be enforced.

SUMMARY

A mobility call management service is disclosed that provides enhanced call management functionality for a wireless mobile terminal (MT). Incoming and/or outgoing calls are managed based on an assessment of the degree of motion of the MT, or other available data pertinent to the MT's physical situation, such as but not limited to it's location, movement, or rate of movement. The degree of motion or other assessment may be used to determine whether a communication can safely terminate on, originate from, or continue safely on the MT, so as to reduce or remove driver distraction.

BRIEF DESCRIPTION OF THE DRAWINGS

These and other features will now be described with reference to the drawings summarized below. These drawings and the associated description are provided to illustrate specific embodiments of the invention, and do not to limit the scope of the invention.

FIG. 1 illustrates a system architecture according to one embodiment of the invention.

FIG. 4, which consists of FIGS. 4a and 4b, illustrates examples of degree of motion calculations.

FIG. 5 illustrates one example of an algorithm that may be used to assess the MT's degree of motion.

FIG. 6 illustrates an example PSTN scenario.

FIG. 7 illustrates an example VoIP scenario.

FIG. 8 illustrates a hybrid PSTN/VoIP scenario.

DETAILED DESCRIPTION OF SPECIFIC EMBODIMENTS

Figure 2A:
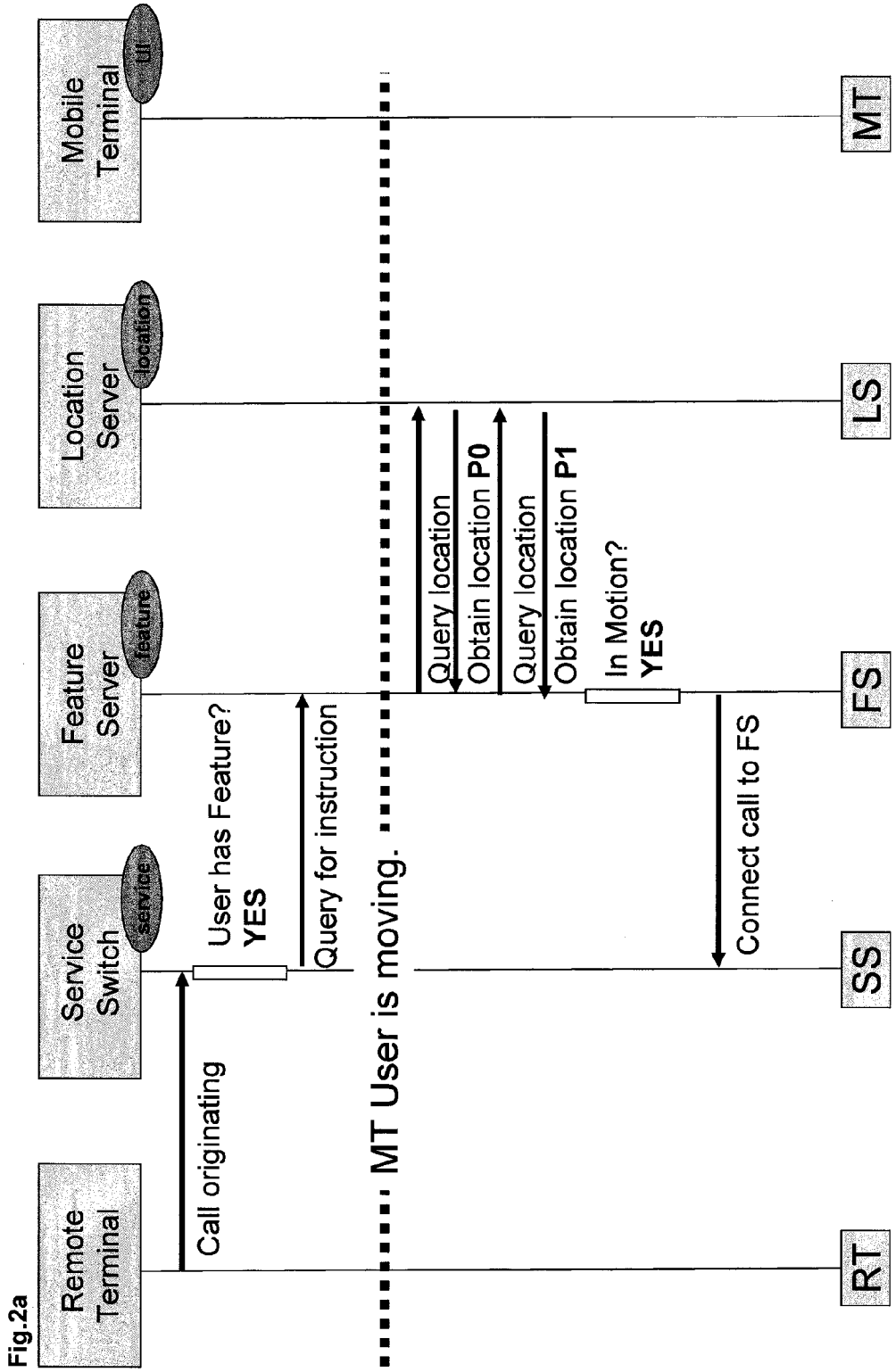
FIG. 2, which consists of FIGS. 2a-2e, is a flow diagram illustrating how an incoming call to a mobile terminal (MT) is managed according to one embodiment of the invention.

Specific embodiments of a system for managing calls to and from mobile terminals (MTs) will now be described with reference to the drawings. This description is intended to illustrate, and not limit the invention. The following terms are used throughout the description:

Mobile terminal (MT)—a portable or stationary device that operates on public and/or private wireless networks capable of providing duplex voice and/or data communications.

Degree of motion—a calculated quantity, based on data regarding the motion and/or other considerations of an MT, that represents an MT's actual or predicted state of motion. The degree of motion assessment is used in the preferred embodiment by a call management application to intelligently manage calls originating from and/or terminating on the subscriber's MT. The degree of motion may, but need not, include a velocity calculation.

Mobility call management—the process of managing an MT call (origination, termination and/or in process) in consideration of the MT, potentially being in motion, as a telecommunications feature involving methods such as but not limited to call routing, for the purpose of improving driving safety and to enhance the subscriber's experience, and the user experience of any other party involved in the call.

System Architecture

As shown in FIG. 1, the system preferably involves the cooperative interaction of four (4) software/hardware entities to perform its functions: (1) a Service Switch (SS) that provides call control capability, (2) a Feature Server (FS) that executes the principle methods of the feature, (3) a Location Server (LS) that provides data including but not limited to location, velocity, and/or other pertinent information regarding the MT and/or the subscriber, and (4) the Mobile Terminal (MT), which runs a client that provides the user interface to the subscriber. As illustrated in FIG. 1, the system also includes the following interfaces: (1) an SS Interface, which is the logical and physical interface between the Feature Server and the Service Switch, (2) an LD Interface, which is the logical and physical interface between the Feature Server and the Location Server, and (3) and MT Interface, which is the logical and physical interface between the Feature Server and the Mobile Terminal; this interface typically operates over a communications network. Each of these components is further described below:

The Remote Terminal (RT) is the communications device through which the remote party participates in the cal, and is the principle element through which the system feature logic interacts with the remote party, the originator or intended terminator of the communication for/by the end user of the MT. There ordinarily is no system specific logic or modules in this element. The remote user interacts with the system feature logic in a manner similar to that used with IVR equipment.

This Service Switch (SS) represents the public or private network element responsible for call control regarding the subscriber communications service, and houses the call control and service interface logic that is part of the MT's standard service. As well, it contains the SS Service Logic Module that is the main point of interaction between the system and the standard service. The system assumes a "two half call" service model that allows for feature insertion and call management as is typically found in a carrier grade telecommunication switch. Note: in situations involving emergency services the system is typically NOT permitted to participate in the communication process.

The Feature Server (FS) is a standalone network service component in which the principle feature software executes. It is the logical hub of the system with interaction modules and interfaces into the SS, the LS, and the MT. The feature server executes feature software that processes MT location data to assess the MT's "degree of motion." In other embodiments of the invention, the feature software may run on a telecommunications switch, the mobile terminals of subscribers, and/or other types of devices.

The Location Server (LS) supplies the feature server with the realtime location data, and/or other data, regarding the MT, as is typical for other Location Based Services (LBS). This data is accessed with the expressed permission of the owner of the MT. The Location Server may physically reside in a third party service provider platform, in the MT itself, in the vehicle, or at some other location. The location server may also provide realtime velocity information if available to the Feature Server.

The Mobile Terminal (MT) is a portable communications enabled device such as, but not limited, to a cellular telephone, and is the mobile element that originates and terminates communications with the end user. The mobile terminal includes a User Interface (UI) for the feature to interact with the end user. This capability is provided by the MT User Interface Module that resides on the MT.

The SS Interface (SSI) allows for command and control signaling interaction between modules on the FS and the SS Service Logic Module. As well, it allows for audio interaction between modules on the FS and the remote user on the RT.

The LD Interface (LDI) is the primary signaling channel through which the feature logic in the FS acquires the location data regarding the MT. This is typically a messaging channel to a third party Location Data Provider server.

The MT Interface (MTI) is the main channel of communication between the feature logic and the end user via the MT. Command and control signaling typically occurs between modules on the FS and the MT User Interface Module. Interaction with the end user occurs via the MT User Interface.

Various alternatives to the architecture shown in FIG. 1 are possible. For example, in a second embodiment of the system architecture, some or all of the cooperating software entities may execute in Service Switch, or Service Switch environment. In a third embodiment of the system architecture, some or all of the cooperating software entities may execute in the Mobile Terminal, or Mobile Terminal environment. Additionally, the system may use additional location based data, including but not limited to map data, to perform the degree of motion assessment. For example, the physical location of the device and/or the vehicle may or may not necessitate that the rules used to assess the degree of motion be augmented.

Additionally, the system may be provided with velocity information pertinent to the MT's physical situation that may or may not necessitate that the rules used to assess the degree of motion be augmented. Additionally, the system may employ locally or remotely available methods and apparatus to ascertain the proximity of the MT to one or more specific vehicles, that may or may not necessitate that the rules used to assess the degree of motion be augmented.

The additional cooperating software entities described above may reside in one of the specified physical elements of the system, or in one or more additional physical elements.

In some embodiments, a subscriber can "bypass" the service when, for example, the subscriber/MT is determined to be in motion but is not actually operating a vehicle (e.g., when the subscriber is riding on a bus or as a passenger in a car. By by-passing the service, the subscriber may contractually accept responsibility for any resulting harm, e.g., via agreement with their insurance carrier, employer, wireless service provider, or another entity. The actions of the subscriber may be appropriately logged for purposes of implementing this feature.

Processing of Incoming Call to an MT

Figure 2C:
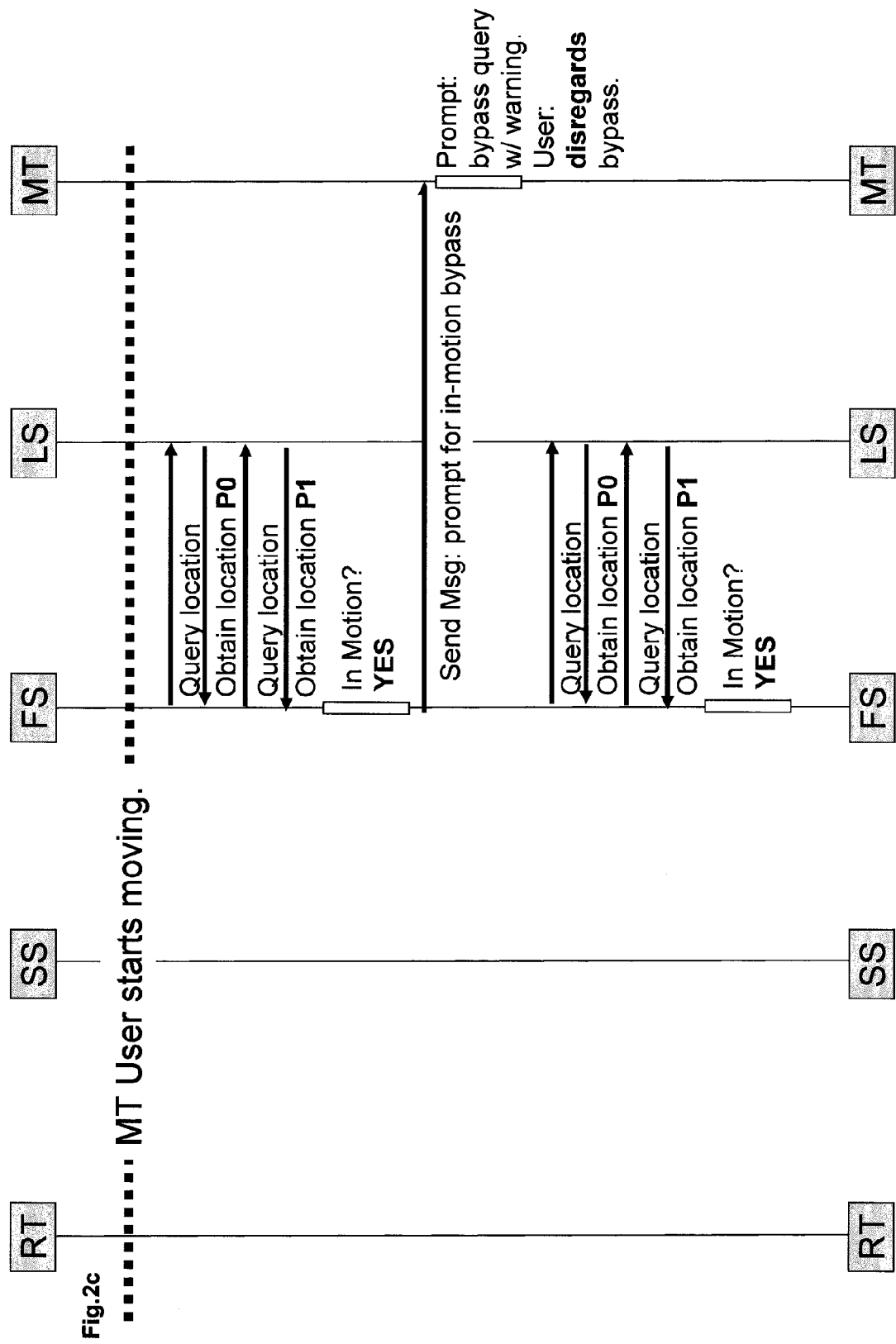
Figure 2D:
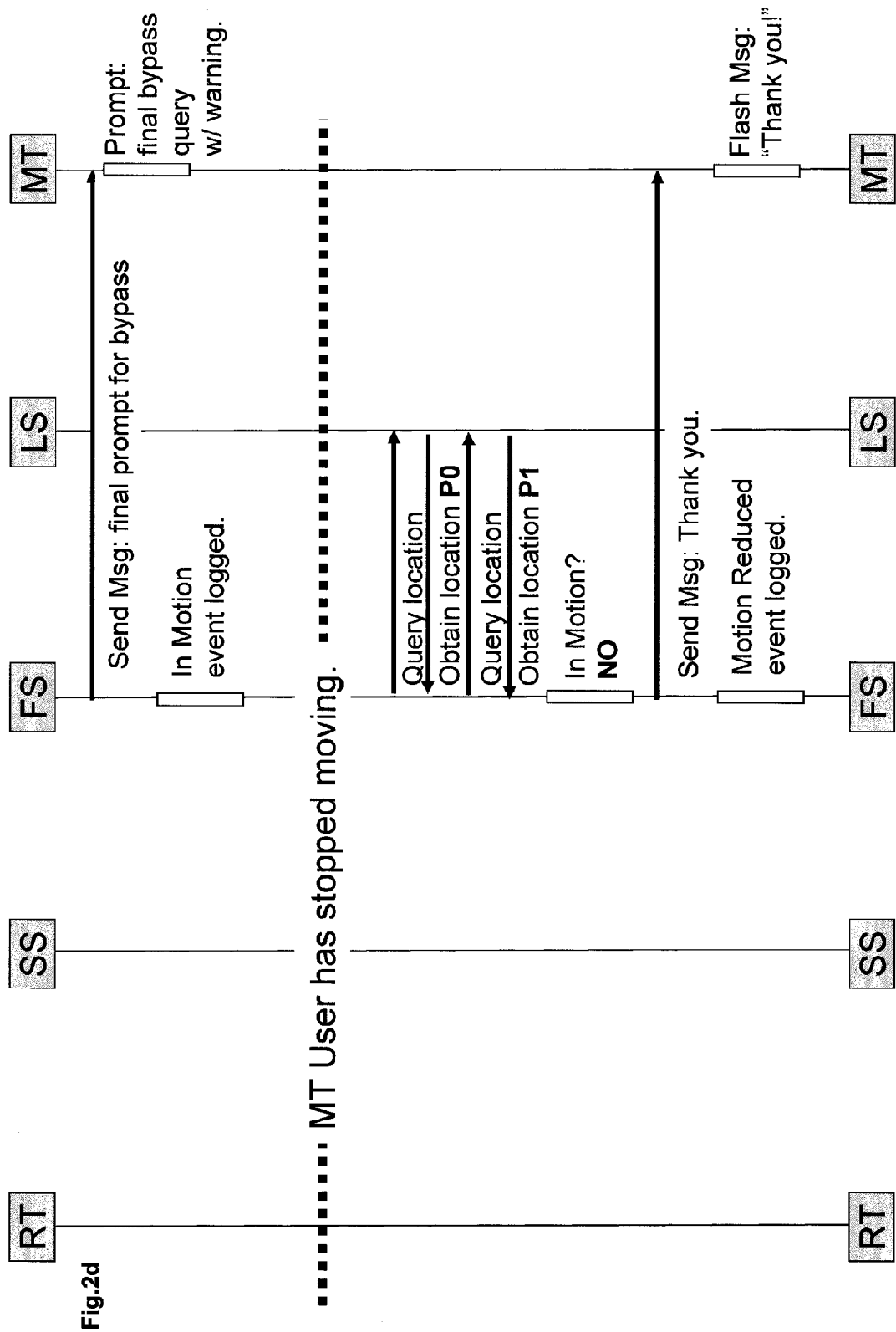
Figure 2E:
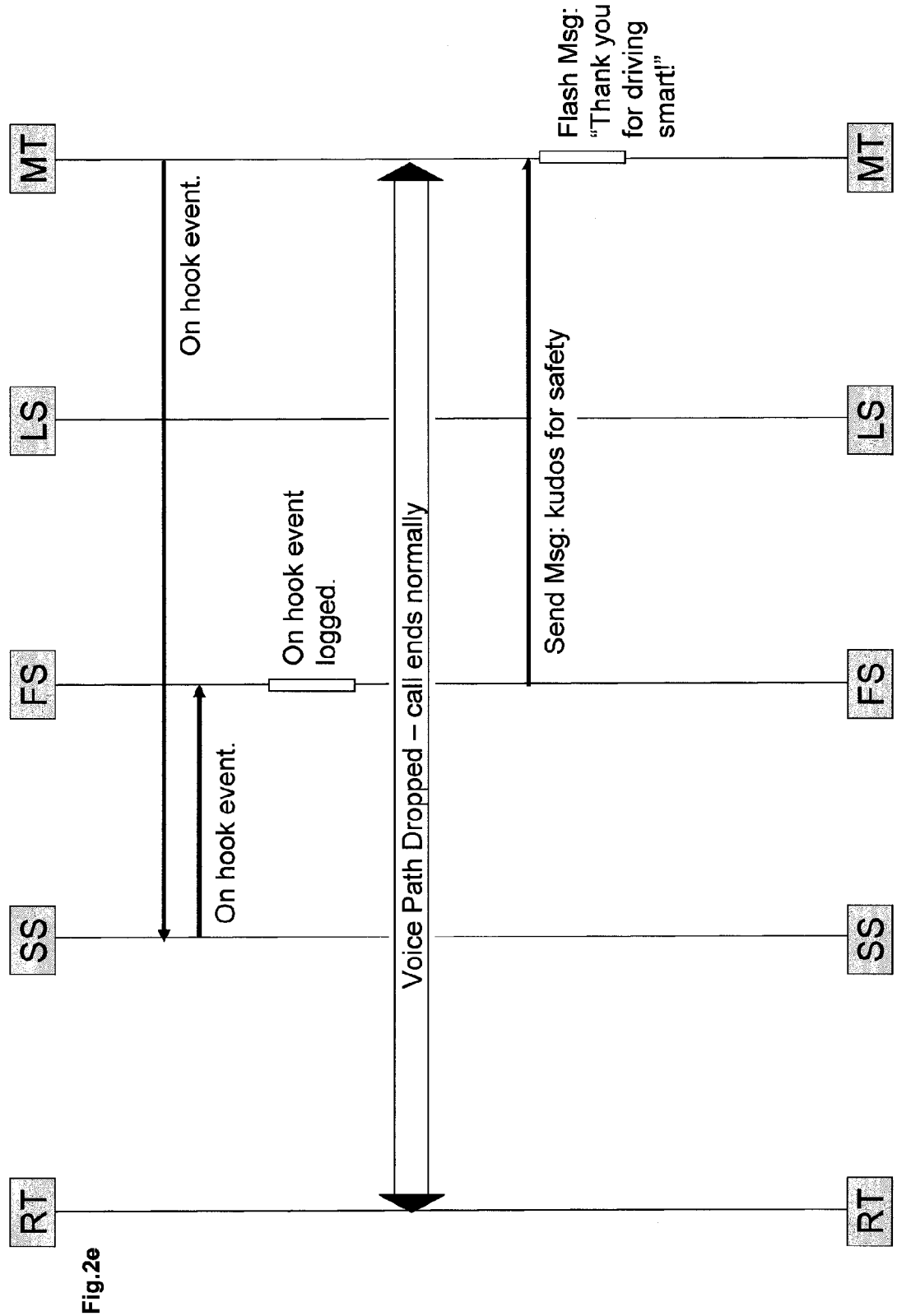

The following discussion illustrate how the system would typically process an incoming communication destined for a typical MT user. In this embodiment, the communication is a generic voice call terminating on a generic MT user of a packet data enabled mobile device. The generic voice call can be realized over a typical mobility voice network or as a VoIP call over a typical mobility packet data network. The incoming call presented here represents only one possible scenario, and is not intended to represent all possible usage scenarios. The following text explains the events presented in the incoming call scenario (FIG. 2):

FIG. 2a:

The remote party (RT) initiates a voice call to a mobile subscriber (MT) that has a network feature active on his mobile voice service. The feature embodies aspects of the invention The system's service logic module (service) that is running in the service provider switch (SS), upon processing the call request, checks and discovers that the subscriber has the feature activated on the line—this triggers the system to execute the mobility call management functions.

The service then queries the feature provider server (FS) for instructions on how to route the call.

At this time the subscriber is driving a motor vehicle, and at this instance is moving.

The system's feature logic modules (feature), running in the feature provider server (FS), initiates periodic "degree of motion" monitoring.

The feature then sequentially queries the location provider server (LS) for several location data points, and executes a "degree of motion" algorithm to obtain an assessment—at this time the assessment result indicates that the "degree of motion" is HIGH as the MT is physically moving quickly and is in an unsafe state. The assessment of whether the MT is in a sufficiently safe state may additionally take into consideration the MT's location, such as whether MT is moving along an unsafe road or road segment as revealed by map data associated with the MT's location.

The feature then responds to the service's query—in this case the feature instructs the service to connect the remote party to the feature server.

FIG. 2b:

The service then establishes a voice path between the remote party and the feature's audio interface.

The feature then plays a recorded voice message to the remote party to: (1) inform him of the subscriber's situation (in motion and therefore may be driving a motor vehicle), and (2) providing an opportunity for the remote party to select alternative call options.

The remote party indicates that they are willing to hold for a reasonable time so as to allow the subscriber to "pull over" and receive the call.

The feature sends a message to the user interface running on the MT requesting it to alert the subscriber that he has an incoming call and that the remote party is waiting for him to possibly "pull over" to receive the call.

The feature then provides treatment, in this case "music on hold", to the remote party while they wait for the call to be connected.

The UI then prompts the user in an appropriate manner—in this case it might play a short midi file once.

At this time the subscriber has "pulled over" and safely stopped, and at this instance is not moving.

The feature, having just performed another assessment as per the monitoring function, determines that it is now appropriate for the call to go through.

The feature instructs the service to transfer the call to the MT.

The service tears down the voice path to the feature and creates a voice path to the MT.

FIG. 2c

At this time the subscriber has started driving again, and at this instance is moving.

The feature, having just performed another assessment as per the monitoring function, determines that the MT is now in motion.

The feature sends a message to the user interface running on the MT requesting it to alert the subscriber that he, having been assessed as now moving, must acknowledge that he is moving, and therefore accept the liability.

The UI then prompts the user in an appropriate manner—in this case it might play a short midi file once.

The user does not respond immediately.

The feature performs another assessment and determines that the MT is still in motion.

FIG. 2d:

The feature sends a final warning message to the user interface running on the MT requesting it to alert the subscriber that he, having been assessed as still moving, must acknowledge that he is moving, and therefore accept the liability.

The UI then prompts the user in an appropriate manner—in this case it might play a short midi file once at a higher volume.

The feature then logs the in-motion call event.

At this time the subscriber has stopped driving again, and at this instance is not moving.

The feature, having just performed another assessment as per the monitoring function, determines that the MT is now NOT in motion.

The feature sends a polite message to the user interface running on the MT requesting it to give the subscriber, having been assessed as not moving, acknowledgment that he is no longer considered to be moving.

The feature then logs the motion reduced call event.

The UI then prompts the user in an appropriate manner—in this case it might play a short midi file once.

FIG. 2e

The MT then notifies the service that the subscriber has "hung up".

The service notifies the feature that the call has terminated.

The feature then logs the "on hook" event and terminates monitoring the MT for motion.

The service tears down the voice path between the RT and the MT, and the call is officially over.

The feature sends a polite message to the user interface running on the MT requesting it to give the subscriber acknowledgment that the monitoring process has terminated successfully.

The UI then prompts the user in an appropriate manner—in this case it might flash a quick message on the MT screen.

Processing of an Outgoing Call from an MT

Figure 3A:
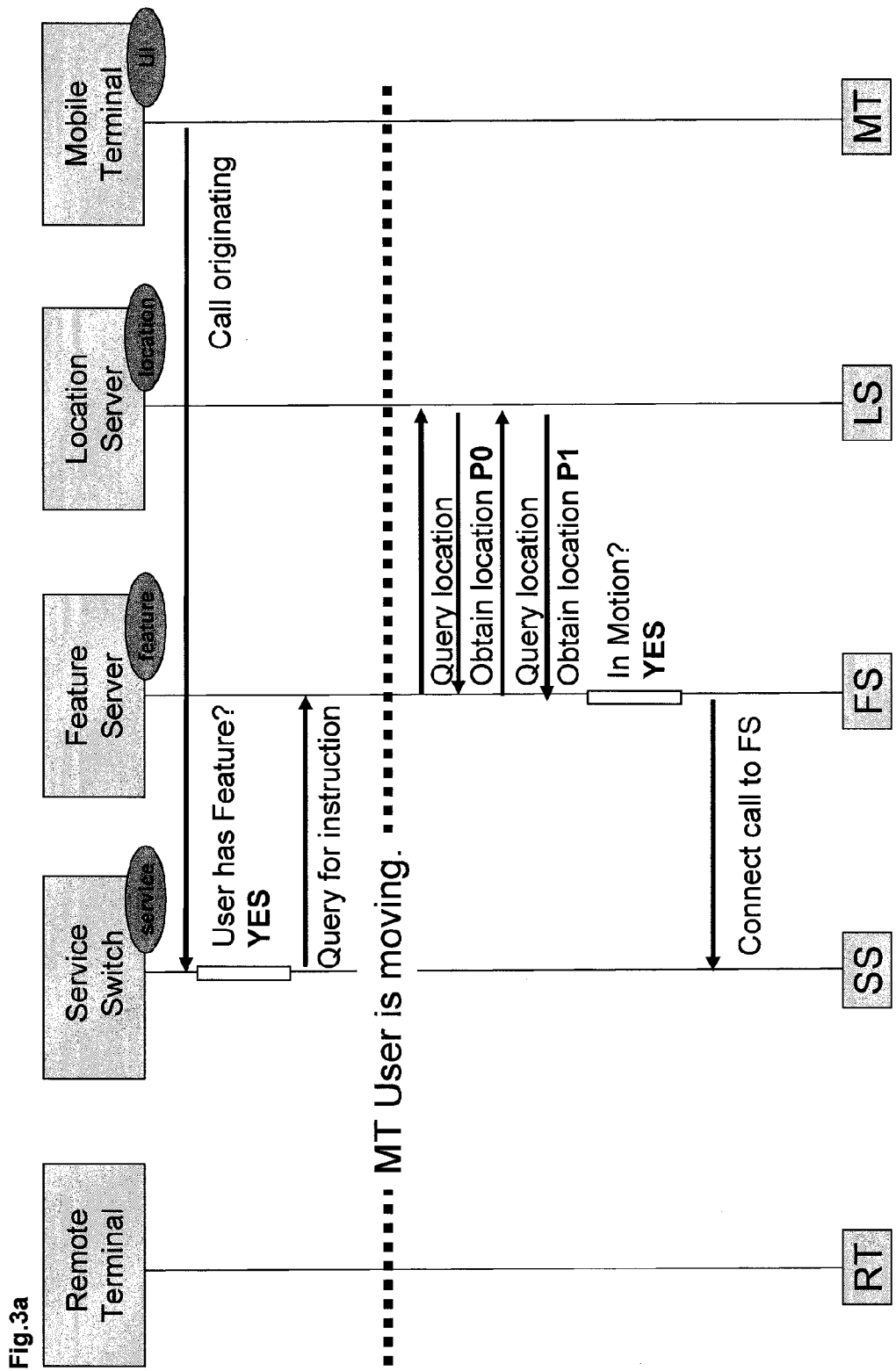
FIG. 3, which consists of FIGS. 3a-3d, is a flow diagram illustrating how an outgoing call from a mobile terminal (MT) is managed according to one embodiment of the invention.
Figure 3B:
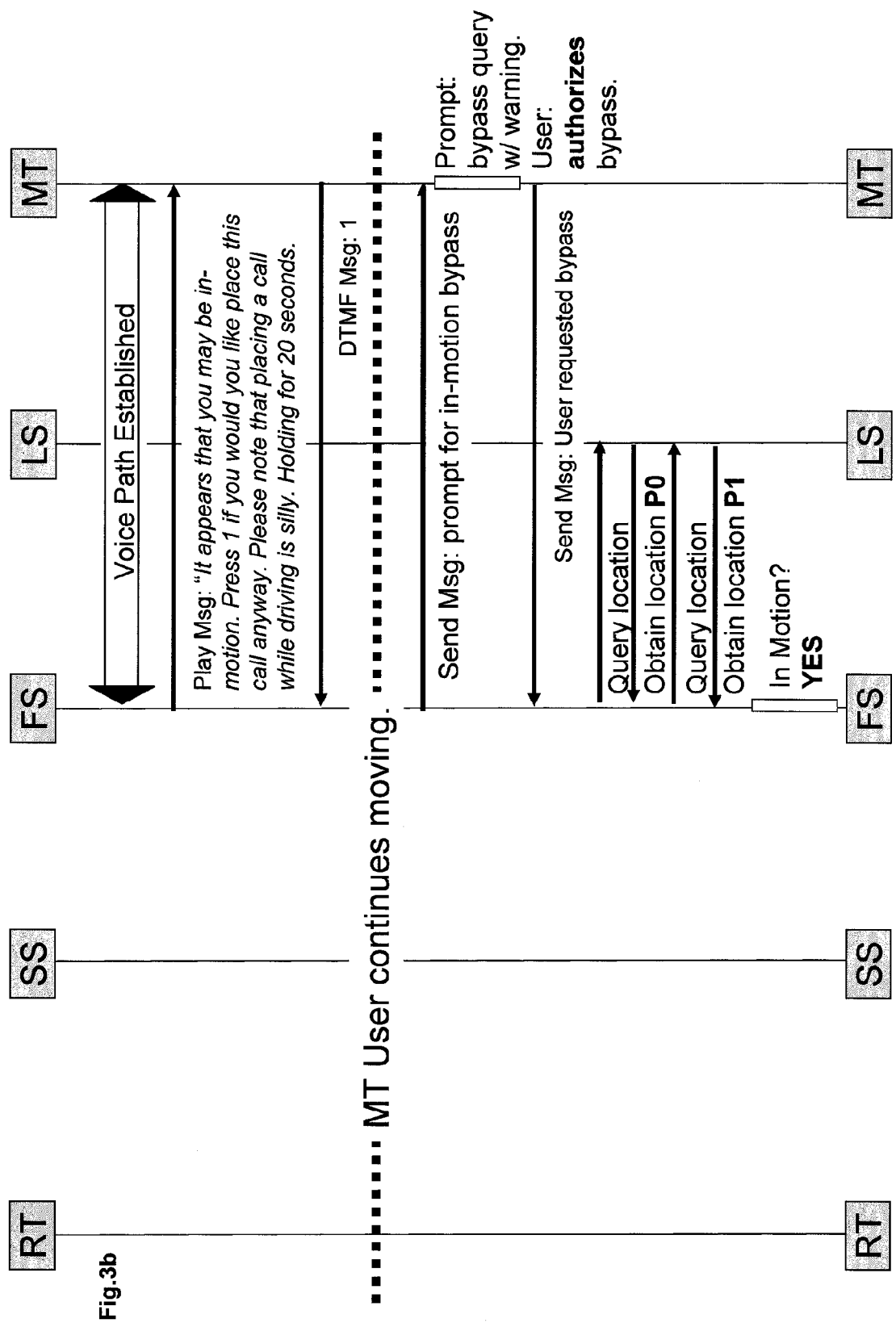
Figure 3C:
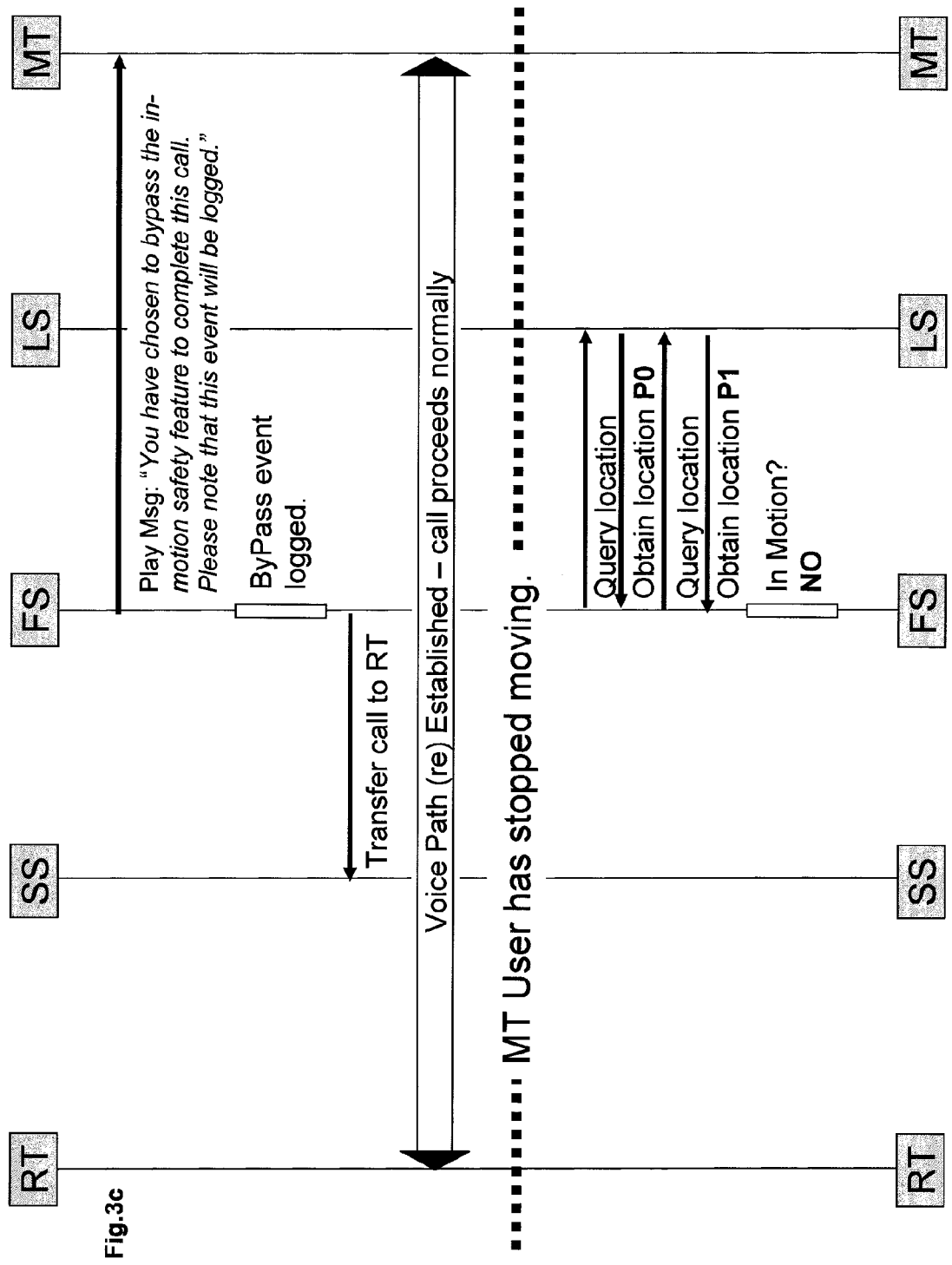
Figure 3D:
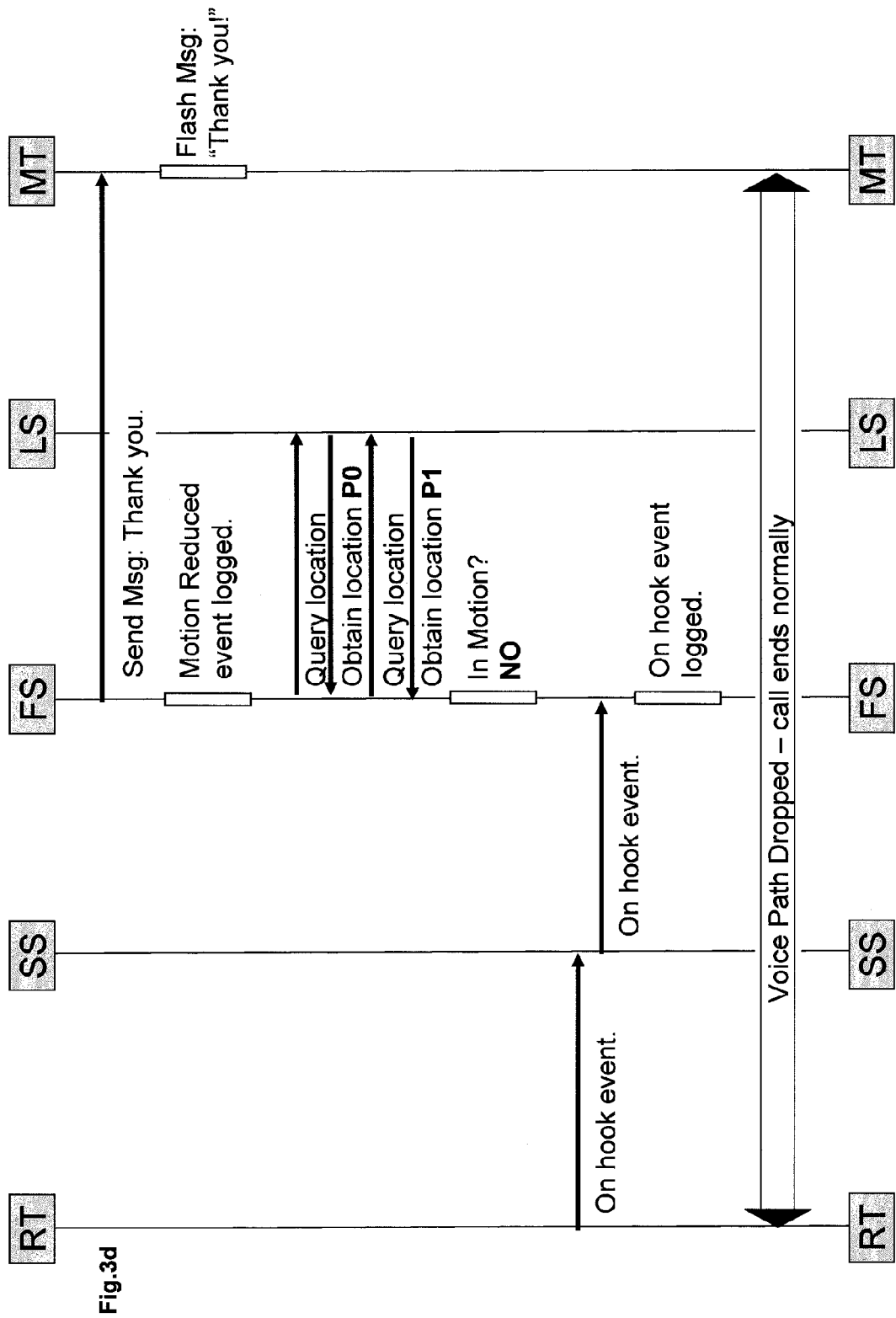

The following discussion illustrates how the system would typically process an outgoing communication from a typical MT/user. In this embodiment, the communication is a generic voice call originating from a generic MT user of a packet data enabled mobile device. The generic voice call can be realized over a typical mobility voice network or as a VoIP call over a typical mobility packet data network. The outgoing call presented here represents only one possible scenario, and is not intended to represent all possible usage scenarios. The following text explains the events presented in the outgoing call scenario (FIG. 3):

FIG. 3a:

The mobile subscriber (MT) initiates a voice call to a remote party (RT). The subscriber has a network feature active on his mobile voice service which embodies certain aspects of the invention.

The system's service logic module (service) that is running in the service provider switch (SS), upon processing the call request, checks and discovers that the subscriber has the feature activated on the line—this triggers the system to execute the mobility call management functions.

The service then queries the feature provider server (FS) for instructions on how to route the call.

At this time the subscriber is driving a motor vehicle, and at this instance is moving.

The system's feature logic modules (feature), running in the feature provider server (FS), initiates periodic "degree of motion" monitoring.

The feature then sequentially queries the location provider server (LS) for several location data points, and executes the "degree of motion" algorithm to obtain an assessment—at this time the assessment result indicates that the "degree of motion" is HIGH as the MT is physically moving quickly.

The feature then responds to the service's query—in this case the feature instructs the service to connect the subscriber to the feature server.

FIG. 3b:

The service then establishes a voice path between the subscriber and the feature's audio interface.

The feature then plays a recorded voice message to the subscriber to: (1) inform him of the assessed motion situation (in motion and therefore may be driving a motor vehicle), (2) provide an opportunity for the subscriber to successfully address the motion situation to enable the call to be placed, or (3) allow the subscriber to authorize the call despite the warning.

The subscriber indicates that they wish to proceed with the call by pressing the "1" key on the MT, or alternatively, by uttering a voice command.

At this time the subscriber continues driving the motor vehicle, and at this instance is moving.

The feature sends a message to the user interface running on the MT requesting it to alert the subscriber that an active acknowledgment is required to bypass the safety feature.

The subscriber indicates that they wish to proceed with the call by pressing the key indicated on the MT's display screen.

The user interface replies to the feature's prompt message thereby delivering the subscriber's active authorization to complete the call setup.

The feature, having just performed another assessment as per the monitoring function, determines that the MT is still in motion.

FIG. 3c:

The feature then plays a recorded voice message to the subscriber informing him that he has bypassed the safety feature and that his call will be completed as per his authorization.

The feature then logs this event as it is a potential violation of the safe usage of an MT in a moving vehicle—these event logs can later serve if needed as evidence that the call was place by an MT that was in a moving vehicle at a known time and place.

The feature then instructs the service to establish a voice path between the MT and the RT.

At this time the subscriber, having considered and taken heed of the warning the feature provided" has stopped driving and "pulled over", and at this instance is no longer moving.

The feature, having just performed another assessment as per the monitoring function, determines that the MT is no longer in motion.

FIG. 3d:

The feature sends a polite message to the user interface (UI) running on the MT requesting it to give the subscriber, having been assessed as not moving, acknowledgment that he is no longer considered to be moving.

The feature then logs the motion reduced call event.

The UI then prompts the user in an appropriate manner—in this case it might flash a brief message on the MT's screen.

The feature, having just performed another assessment as per the monitoring function, determines that the MT is still NOT in motion.

The RT then notifies the service that the remote party has "hung up".

The service notifies the feature that the call has terminated.

The feature then logs the "on hook" event and terminates monitoring the MT for motion.

The service tears down the voice path between the RT and the MT, and the call is officially over.

Degree of Motion Calculation

The "degree of motion" assessment provides a mobility call management application with data, the "assessment", that allows the intelligent management of calls if and when the subscriber's MT is in motion. Any of a variety of known methods assessing the MT's degree of motion may be used. The assessment preferably provides a value that places the MT in one of a series of possible ranges. The ranges, or zones, are strong indicators of the potential range of velocities that an MT is experiencing at the time of the assessment.

In one embodiment, the method provides an assessment that places the MT in one of three zones. For example (FIG. 4), the assessment could be: (1) a high "degree of motion" (H zone), (2) a medium "degree of motion" (M zone), or (3) a low degree of motion (L zone). In this example, a high assessment might indicate that no active communications may take place. A medium assessment might indicate that no active communications may take place however the subscriber can be alerted. A low assessment might indicate that the subscriber is either not in motion or moving very slowly and can safely participate in a communication. A greater number of zones, such as four, five or six, may alternatively be used.

In one embodiment, the method uses as input two or more data points. A data point contains two parameters, a global position (latitude, longitude) and a time (the time the position data was taken). The initial data point (p0) is considered to be the origin point for the calculation. The subsequent data points are statistically mapped to each of the possible ranges. Specifically, the relative or weighted contribution of each data point is statistically calculated for each zone and added to the zones sum. The method will return the value of the zone with the highest sum. That is, the method returns an indication to the zone that the MT's motion is statistically most probably associated with.

In the first example (FIG. 4a) one additional data point (p1) is provided as input to the method. At the time the data is acquired the MT is in a motor vehicle that is moving very quickly. The method maps the data to the zones placing the second point in zone H relative to the origin point. This assessment results in a significantly high probability that the MT is in a fast moving vehicle. Only one assessment is typically sufficient in such cases.

In the second example (FIG. 4b) three additional data points (p1, p2, p3) are provided as input to the method. In this example, at the time the data is acquired, the MT is not in a moving vehicle, however the subscriber is in motion (for example, jogging). The method maps the data to the zones as indicated. The assessments results in a significantly high probability that the MT is either not in a fast moving vehicle or not in a vehicle at all.

If velocity data is available for the vehicle in which the MT is situated, it can be used in the "degree of motion" assessment in place of location data.

As can be seen from the input data examples (FIG. 4), the zones preferably overlap. That is, there is a probability gradient associated with each zone that determines the "weight" each data point contributes to each zone sum. For example, data point p2 (FIG. 4b) contributes a slight value to both M zone and L zone, while data point p1 contributes to only the L zone.

As can be seen from the example algorithm (FIG. 5), the assessment calculation may execute one or more times before returning the final value to the feature.

A typical deployment of the system in a PSTN scenario is illustrated in FIG. 6. A typical deployment of the system in a VoIP scenario is provided in FIG. 7. A typical deployment of the system in a PSTN-VoIP hybrid scenario is provided in FIG. 8.

As illustrated by the forgoing, the system provides mobility call management of an MT to reduce or eliminate the unsafe generation of attentional interference on subscribers caused by engaging in the use of an MT while operating a motor vehicle. The system has the ability to calculate and provide an assessment of the "degree of motion" that an MT is experiencing based on two or more time stamped location data points obtained in realtime from a location data source. Alternatively, the assessment can be made with realtime velocity data in place of or in addition to location data.

The system has the ability to enhance call management by assessing the "degree of motion" that an MT is experiencing and providing appropriate feature logic to assist in the call management process, thereby improving and encouraging the safe use of the MT: (a) when an incoming call is being considered for delivery to an MT; (b) when an outgoing call is being considered for delivery to a remote party, and/or (c) when a ongoing call between an MT and one or more remote parties continues.

The system has the ability to enhance call management, should the MT be assessed as having a considerable "degree motion" indicating that the subscriber may be driving a motor vehicle at that time, when an incoming call is being considered for delivery to an MT, by doing any one or more of the following: (a) informing the remote party of the subscriber's situation, and possibly permitting the remote party to chose alternative call processing options such as but not limited to having the call transferred to the subscriber's voice mail; (b) informing the subscriber, and possibly permitting the subscriber to chose alternative call processing options such as but not limited to having the call transferred to voice mail; (c) informing the subscriber, and possibly permitting the subscriber to safely stop and accept the call; (d) informing the subscriber, and permitting the subscriber to override the service, such as when the subscriber is a passenger in a moving vehicle and can safely engage in a call.

The system also has the ability to enhance call management when an outgoing call is being considered for delivery from an MT and the MT is assessed as having a considerable "degree motion" indicating that the subscriber may be driving a motor vehicle at that time. For example, in this scenario, the system may (a) inform the subscriber, and possibly permit the subscriber to safely stop and make the call; and/or (b) inform the subscriber, and permit the subscriber to override the service, such as when the subscriber is a passenger in a moving vehicle and can safely engage in a call.

The system also has the ability to enhance call management when an ongoing call between an MT and one or more remote parties is in progress and the MT is assessed as having a considerable "degree motion." In this scenario, the system may enhance call management by doing one or more of the following: (a) informing the remote party of the subscriber's situation, and possibly permitting the remote party to chose alternative call processing options such as but not limited to having the call transferred to the subscriber's voice mail; (b) informing the subscriber, and possibly permitting the subscriber to choose alternative call processing options such as but not limited to having the call transferred to voice mail; (c) informing the subscriber, and possibly permitting the subscriber to safely stop and continue the call; (d) informing the subscriber, and permitting the subscriber to override the service, such as when the subscriber is a passenger in a moving vehicle and can safely be engaged in a call.

The system may be configured to monitor and log an MT's call events that occur when the "degree of motion" is assessed as exceeding the permitted value or returning to the permitted value, or when the "degree of motion" is assessed as exceeding the permitted value and the subscriber has been informed and actively authorizes the call to proceed.

The system may also be capable of using other sources of MT location data, including, but not limited to, any one or more of the following: 1) a third party MT location provider, 2) an application running on the MT, 3) an application running in the motor vehicle that the MT is located in, or 4) a third party vehicle location provider of the motor vehicle that the MT is located in.

The system preferably has the ability to provide mobile call management features to enhance the subscriber's, and/or any other party's involved in the call, mobile call experience, such as but not limited to: (a) playing a distinctive audio indication including, but not limited to, a musical sequence of tones as indication to a remote party attempting to place a call to an MT subscriber that the feature is active on their service, (b) recording a short voice message from the remote party/caller for the MT subscriber/callee, and delivering this message to the subscriber in a safe and appropriate manner that does not require the subscriber to dial or log-in to a voicemail system (e.g., the recorded message may be played automatically in response to a single key depression by the subscriber, in response to the MT's degree of motion falling to an acceptable level, or automatically once the message has been left), (c) providing a list of incoming call attempts that were withheld and/or diverted by the feature via the MT, a web interface, or in any other manner, (d) providing the subscriber with the means and opportunity to reply to one or more of the calls attempts that were withheld and/or diverted by the feature via the MT, a web interface, or in any other manner. (e) diverting call attempts that were withheld and/or diverted by the feature to one or more of: a voice mail service, an attendant, a designated person, a call management facility, or any other specified location.

The system may use commercially available or manufacturer supplied in-vehicle technology, such as but not limited to vehicle telemetry via Bluetooth or Wi-Fi connectivity, to perform or enhance the capabilities of the system.

The system may include the ability to provide feature activation by multiple means, such as, but not limited to, (a) the subscriber via any local means enabled to do so such as but not limited to a soft key on the MT, (b) an in-vehicle device such as but not limited to a Bluetooth unit or an EDR enabled to do so, (c) by the feature itself given specific data warranting the activation such as but not limited to GPS data and/or location data The system may use commercially available location specific data, such as but not limited to road or terrain information and weather conditions, to perform or enhance the capabilities of the system.

The system may have the ability to employ use data pertaining to the subscriber such as, but not limited to, age, driving record, and appropriate demographics, to perform or enhance the capabilities of the system.

The system preferably has the following characteristics: (a) system does not disable the use of the MT; (b) the system does not require any "in vehicle" devices or systems, however, it may make use of select available data that the in-vehicle device provides in it regular operation; (c) the system does not interfere with the proper functioning of the MT radio with the base station; this is in contrast to some prior art systems that jam or interfering with the MTs transmission and/or reception capability to restrict usage; (d) the system preferably does not monitor the driver of the vehicle for purposes of determining whether an MT call can safely take place; (e) the system functions without requiring specific knowledge of the involvement of a motor vehicle; (f) system will function when the MT is in any moving vehicle, such as but not limited to cars, trucks, busses, trains, boats and airplanes; (g) system allows the user to responsibly use the MT in situations that warrant it, such as in the event of an emergency, and in appropriate situations that are not possible to foresee.

The various features and functions described above may be embodied in software modules executed by general purpose and/or special purpose computers. The software modules may be stored on any type of computer readable medium or computer storage device.

The various features described herein may be used in combination with any one or more of the features described in U.S. Provisional Appl. No. 60/892,628, filed Mar. 22, 2007, titled ENHANCED CELLULAR MOBILITY CALL AND SESSION MANAGEMENT, the entire disclosure of which is hereby incorporated by reference. For instance, the system described herein can be augmented to include some or all of the system components, and to implement some or all of the methods, described in Appl. 60/892,628.

Although the invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the claims.

What is claimed is:

1. A method of processing a call from a remote terminal to mobile terminal, comprising:
    determining a plurality of risk assessment states for a defined geographic zone, each risk assessment state reflecting a potential degree of user risk associated with using the mobile terminal to engage in a communications session within the defined geographic zone, each risk assessment state being determined at least in part based on a degree of motion of the mobile terminal and additional criteria, the plurality of risk assessment states including at least:
        a low risk assessment state associated with a degree of motion below a first threshold,
        a medium risk assessment state associate with a degree of motion above the first threshold and below a second threshold, and
        a high risk assessment state associated with a degree of motion above the second threshold;
    assessing, by call routing logic implemented by a feature logic module, a degree of motion of the mobile terminal, wherein the call routing logic is communications network based logic that assesses a state of a mobile terminal and instructs network components on the routing of calls;
    determining, by the call routing logic, a risk assessment state of the mobile terminal, the determined risk assessment state corresponding to one of the determined plurality of risk assessment states; and
    determining by the call routing logic, whether to route the call to risk mitigation logic implemented by a feature logic module based at least in part on the determined risk assessment state of the mobile terminal, wherein the risk mitigation logic is network based logic that executes risk mitigation routines in response to a determined risk assessment state of a mobile terminal, wherein the routing of the call to the risk mitigation logical module does not cause a modification of call functionality of the mobile terminal, and wherein:
        if the determined risk assessment state corresponds to the low risk assessment state, the call is not routed to the risk mitigation logic,
        if the determined risk assessment state corresponds to the medium risk assessment state, the call is routed to the risk mitigation logic, wherein the risk mitigation logic is operable to prevent communication between the remote terminal and the mobile terminal and to cause output of an audible warning to a user the mobile terminal, and
        if the determined risk assessment state corresponds to the high risk assessment state, the call is routed to the risk mitigation logic, wherein the risk mitigation logic is operable to prevent communication between the remote terminal and the mobile terminal without causing the output of the audible warning.

2. The method of claim 1, wherein if the determined risk assessment state corresponds to the medium risk assessment state the risk mitigation logic provides functionality for keeping the call on hold until the risk assessment state of the mobile terminal is reduced to a low risk assessment state.

3. The method of claim 2, further comprising subsequently causing, by a call routing logic, the connection of the call to the mobile terminal in response to detecting that the risk assessment state of the mobile terminal has reached a low risk assessment state.

4. The method of claim 1, further comprising, in response to a determination that the call should be routed to a risk mitigation logical module, causing an output, by the risk mitigation logic, of an audible message to the caller indicating that the callee is in motion.

5. The method of claim 1, wherein the audible warning to the user of the mobile terminal is an audible signal other than a ring signal.

6. The method of claim 1, wherein determining whether to route the call to a risk mitigation logical module further comprises assessing, by the call routing logic, whether the mobile terminal is in a defined geographic zone.

7. The method of claim 6, wherein determining whether the mobile terminal is in a defined geographic zone comprises using map data to assess whether the mobile terminal is moving along defined a road or road segment.

8. The method of claim 1, further comprising, in response to a determination that the call should be routed to the risk mitigation logic, recording a voice message from the caller, and subsequently causing, by the risk mitigation logic, the mobile terminal to automatically play the voice message.

9. The method of claim 1 further comprising:
    assessing, by the risk mitigation logic, a location of the mobile terminal during the call;
    determining, by the risk mitigation logic, the mobile terminal is moving along a road or road segment based on a comparison of the location of the mobile terminal and map data; and
    updating the determined risk assessment state of the mobile terminal based at least in part on the determination of the mobile terminal moving along the road or road segment.

10. The method of claim 1 further comprising:
    assessing, by the call routing logic, a location of the mobile terminal; and determining, by the call routing logic, whether the location of the mobile terminal matches locations identified from map data;
wherein determining the risk assessment state of the mobile terminal is based at least in part on the determination of whether the location of the mobile terminal matches locations identified from map data.

11. The method of claim 1, wherein assessing by the call routing logic a degree of motion of the mobile terminal includes receiving information from the mobile terminal related to the degree of motion of the mobile terminal.

12. A method of processing an ongoing call between a remote terminal and a mobile terminal, comprising:
determining a plurality of risk assessment states for a defined geographic zone, each risk assessment state reflecting a potential degree of user risk associated with using the mobile communications device to engage in a communications session within the defined geographic zone, each risk assessment state being determined at least in part based on a degree of motion of the mobile terminal and additional criteria, the plurality of risk assessment states including at least:
 a first risk assessment state associated with a first potential degree of user risk, the first potential degree of user risk indicating that the mobile terminal is available to communicate with a remote terminal,
 a second risk assessment state associate with a second potential degree of user risk, the second potential degree of user risk indicating that the mobile terminal is available to communicate with a remote terminal only after the user of the mobile terminal receives and acknowledges a warning signal, and
 a third risk assessment state associate with a third potential degree of user risk, the third potential degree of user risk indicating that the mobile terminal is unavailable to communicate with a remote terminal;
assessing, by call routing logic implemented by a feature logic module, a degree of motion of the mobile terminal during the call, where the call routing logic is communications network based logic that assesses a state of a mobile terminal and causes the execution of risk mitigation routines in response to an assessed risk assessment state of a mobile terminal;
determining, by the call routing logic, a risk assessment state of the mobile terminal, the determined risk assessment state corresponding to one of the determined plurality of risk assessment states; and
determining, by the call routing logic, whether to cause the execution of a risk mitigation routine by a risk mitigation logic implemented by a feature logic module, the determination based at least in part on the determined risk assessment state of the mobile terminal, wherein the risk mitigation logic is a network based module that executes risk mitigation routines in response to an assessed state of a mobile terminal, wherein execution of a risk mitigation routine does not cause a modification of call functionality of the mobile terminal, and wherein:
 if the determined risk assessment state corresponds to the first risk assessment state, execution of a risk mitigation routine by the risk mitigation logic is not caused,
 if the determined risk assessment state corresponds to the second risk assessment state, a risk mitigation routine is executed by the risk mitigation logic which causes the mobile terminal to output an alert message indicating that the mobile terminal has reached the second risk assessment state and prompting a user of the mobile terminal to acknowledge the alert message,
 if the determined risk assessment state corresponds to the third risk assessment state, a risk mitigation routine is executed by the risk mitigation logic which causes the mobile terminal to output an alert message indicating that the mobile terminal has reached the third risk assessment state and which causes communication between the mobile terminal and the remote terminal the cease.

13. The method of claim 12, wherein prompting the user to acknowledge the alert message comprises presenting, by the risk mitigation logic, the user an option to continue the call.

14. The method of claim 13, further comprising logging, by the risk mitigation logical, the user's selection of an option to continue the call after receiving the alert message.

15. The method of claim 14, further comprising providing, by the risk mitigation logic, an authorized entity restricted, network-based access to the logged selection of the user.

16. The method of claim 12, further comprising disconnecting, by the risk mitigation logic, the call if the user does not perform a predefined action in response to the alert message.

17. The method of claim 12 further comprising:
assessing, by the risk mitigation logic, a location of the mobile terminal during the call;
determining, by the risk mitigation logic, the mobile terminal is moving along a road or road segment based on a comparison of the location of the mobile terminal and map data; and
updating the determined risk assessment state of the mobile terminal based at least in part on the determination of the mobile terminal moving along the road or road segment.

18. The method of claim 12, wherein assessing by the call routing logic a degree of motion of the mobile terminal during the call includes receiving information from the mobile terminal related to the degree of motion of the mobile terminal.

19. A method of processing a call from a mobile terminal, comprising:
determining a plurality of risk assessment states for a defined geographic zone, each risk assessment state reflecting a potential degree of user risk associated with using the mobile communications device to engage in a communications session within the defined geographic zone, each risk assessment state being determined at least in part based on a degree of motion of the mobile terminal and additional criteria, the plurality of risk assessment states including at least:
 a first risk assessment state associated with a first potential degree of user risk, the first potential degree of user risk indicating that the mobile terminal is available to communicate with a remote terminal,
 a second risk assessment state associate with a second potential degree of user risk, the second potential degree of user risk indicating that the mobile terminal is available to communicate with a remote terminal only after the user of the mobile terminal receives and acknowledges a warning signal, and
 a third risk assessment state associate with a third potential degree of user risk, the third potential degree of user risk indicating that the mobile terminal is unavailable to communicate with a remote terminal;
assessing, by call routing logic implemented by a feature logic module, a current risk assessment state of the mobile terminal, said current risk assessment state being based, at least in part, on a degree of motion of the mobile terminal and additional criteria, where the call routing logic is communications network based logic that assesses a risk assessment state of a mobile terminal and instructs logic modules on the routing of calls; and determining by the call routing logic, whether to route the call to risk mitigation logic implemented by a feature logic module based at least in part the assessed risk assessment state of the mobile terminal, wherein the risk mitigation logic is network based logic that executes risk mitigation routines in response to a determined risk assessment state of a mobile terminal, wherein the routing of the call to the risk mitigation logical module does not cause a modification of call functionality of the mobile terminal, and wherein:

if the determined risk assessment state corresponds to the first risk assessment state, the call is not routed to the risk mitigation logic, if the determined risk assessment state corresponds to the second risk assessment state, the call is routed to the risk mitigation logic, wherein the risk mitigation logic is operable to prevent communication between the remote terminal and the mobile terminal and to cause output of an audible warning to a user of the mobile terminal, the audible warning message providing a plurality of options for processing the call, and if the determined risk assessment state corresponds to the third risk assessment state, the call is routed to the risk mitigation logic, wherein the risk mitigation logic is operable to prevent communication between the remote terminal and the mobile terminal without causing the output of the audible warning.

20. The method of claim 19, wherein the plurality of options includes an option for the user to authorize the call despite the warning message, and the method further comprises logging user selection of the option to authorize the call.

21. The method of claim 20, further comprising providing an authorized entity restricted, network-based access to logged event data reflective of said user selection.

22. The method of claim 19, wherein the plurality of options includes an option for the user to request that placement of the call be delayed until the mobile terminal reaches the first risk assessment state.

23. The method of claim 19 further comprising:
assessing, by the risk mitigation logic, a location of the mobile terminal during the call;
determining, by the risk mitigation logic, the mobile terminal is moving along a road or road segment based on a comparison of the location of the mobile terminal and map data; and
updating the determined risk assessment state of the mobile terminal based at least in part on the determination of the mobile terminal moving along the road or road segment.

24. The method of claim 19, wherein assessing by the call routing logic a current risk assessment state of the mobile terminal includes receiving information from the mobile terminal related to the degree of motion of the mobile terminal.

25. The method of claim 9, wherein assessing by a risk mitigation logic a location of the mobile terminal during the call includes receiving information from the mobile terminal related to the location of the mobile terminal.

26. The method of claim 17, wherein assessing by a risk mitigation logic a location of the mobile terminal during the call includes receiving information from the mobile terminal related to the location of the mobile terminal.

27. The method of claim 23, wherein assessing by a risk mitigation logic a location of the mobile terminal during the call includes receiving information from the mobile terminal related to the location of the mobile terminal.

28. The method of claim 10, wherein assessing by a call routing logic a location of the mobile terminal includes receiving information from the mobile terminal related to the location of the mobile terminal.

* * * * *